(12) United States Patent
Boreman et al.

(10) Patent No.: US 7,095,027 B1
(45) Date of Patent: Aug. 22, 2006

(54) MULTISPECTRAL MULTIPOLARIZATION ANTENNA-COUPLED INFRARED FOCAL PLANE ARRAY

(75) Inventors: Glenn D. Boreman, Geneva, FL (US); Francisco J. Gonzalez, Orlando, FL (US); James L. Porter, Tucson, AZ (US)

(73) Assignees: University of Central Florida Research Foundation, Inc., Orlando, FL (US); Raytheon Missile Systems, Wilmington, DE (US)

( * ) Notice: Subject to any disclaimer, the term of this patent is extended or adjusted under 35 U.S.C. 154(b) by 177 days.

(21) Appl. No.: 10/787,919

(22) Filed: Feb. 25, 2004

(51) Int. Cl.
*G01J 5/20* (2006.01)

(52) U.S. Cl. .............................. 250/338.4; 250/338.1; 250/341.3; 250/332

(58) Field of Classification Search ............. 250/338.4, 250/341.3, 332, 338.1, 494, 540, 465
See application file for complete search history.

(56) References Cited

U.S. PATENT DOCUMENTS

| | | | | |
|---|---|---|---|---|
| 5,007,715 A | | 4/1991 | Verhulst | 350/334 |
| 5,239,179 A | * | 8/1993 | Baker | 250/338.4 |
| 5,362,671 A | | 11/1994 | Zavracky et al. | 437/81 |
| 5,999,122 A | | 12/1999 | Shoucri et al. | 342/351 |
| 6,323,486 B1 | | 11/2001 | Grossman et al. | 250/338 |
| 6,329,649 B1 | | 12/2001 | Jack et al. | 250/250 |
| 6,329,655 B1 | | 12/2001 | Jack et al. | 250/338.1 |
| 6,404,397 B1 | | 6/2002 | Grinberg et al. | 343/753 |
| 6,410,917 B1 | | 6/2002 | Choi | 250/338.4 |
| 6,441,368 B1 | | 8/2002 | Grinberg et al. | 250/239 |
| 6,459,084 B1 | | 10/2002 | Boreman et al. | 250/338.4 |
| 6,489,615 B1 | | 12/2002 | Bluzer | 250/338.1 |
| 6,770,882 B1 | * | 8/2004 | Carr et al. | 250/338.1 |
| 2003/0122079 A1 | | 7/2003 | Pobanz et al. | 250/336.1 |

* cited by examiner

*Primary Examiner*—Renee Luebke
*Assistant Examiner*—Mary Zettl
(74) *Attorney, Agent, or Firm*—Brian S. Steinberger; Law Offices of Brian S. Steinberger, P.A.

(57) ABSTRACT

Adjacent pixels of an infrared focal plane array (IR FPA) can be configured to have different spectral or polarization responses by adjustment of the lengths or orientations of the antenna arms which couple radiation into the sensors. The manufacturing costs of such an antenna-coupled IR FPA would be much less than integration of spectral or polarization filters onto each pixel, or fabrication of adjacent pixels with materials of different bandgaps. The antenna-coupled pixels can be made smaller than usual pixels, allowing this diversity of spectral or polarization information on the FPA without losing spatial resolution. The infrared (IR) sensors can be tunnel diodes, schottky diodes, photovoltaics, photoconductors, bolometers, and pyroelectrics. Application areas can include military and civilian remote sensing, automotive driving aids, industrial sensing, medical imaging, and general surveillance.

18 Claims, 8 Drawing Sheets

| Arm Configuration | Maximum Polarization | |
|---|---|---|
|  |  | 0° |
|  |  | 90° |
|  |  | +45° |
|  |  | −45° |

Fig. 7

MULTISPECTRAL MULTIPOLARIZATION ANTENNA-COUPLED INFRARED FOCAL PLANE ARRAY

FIELD OF USE

This invention relates to the field of infrared detectors, and in particular to an infrared focal plane arrays and methods of using the arrays that can be configured to have different spectral or polarization responses by adjusting lengths or orientations of the antenna arms that couple radiation into the sensors.

BACKGROUND AND PRIOR ART

Infrared (IR) systems have been widely used in the past. A conventional system has an array of large-area detectors wherein each detector corresponds to a single picture element (pixel) for an image. Each detector is a planar structure that has both the length and width dimensions larger than the wavelength of the incident radiation such that the detector has adequate collection area for the incident radiation.

A principal limitation has been the spectral or polarization response of infrared systems. Typically, an infrared detector is responsive to only a small region of infrared radiation or to the entire band of infrared radiation. Systems for multi-spectral or multi-polarization response use multiple detectors, sensitive to different wavelengths or different polarizations of infrared radiation, together with a beamsplitter to direct the infrared radiation to the multiple detectors.

Current systems for polarization control generally require bulk optical systems having multiple moving parts. Image forming radiation is typically collected for a fixed polarization state. Optical filters must be used in the optical train before the receiving detector array. The selection of the polarization state requires mechanical motion of the optical filters. The typical weight of the necessary filter and switching assemblies is on the order of 1 kg or more. The required time to switch between polarization states can be on the order of 2 seconds or more. Polarization-resolved imagery is largely unexploited, because of inconvenient implementation.

Multi-spectral and multi-polarization infrared response is alternatively achieved by integrating spectral or polarization filters onto each pixel of a detector or by fabrication of adjacent pixels with materials of different bandgaps.

Many U.S. patents have been proposed for infrared detectors but have many of the problems previously described including the preference inadequacy of the antenna systems. Arrays of infrared sensors are known: see for example U.S. Pat. No. 5,021,663 to Hornbeck; U.S. Pat. No. 5,286,976 to Cole; U.S. Pat. No. 5,300,915 to Higashi, et al; U.S. Pat. No. 5,367,167 to Keenan; U.S. Pat. No. 5,591,959 to Cigna, et al; U.S. Pat. No. 5,647,956 to Belcher, et al; and, U.S. Pat. No. 5,436,453 to Chang et al but nowhere is there a mention of antenna-coupled sensors.

Blackwell, et al in U.S. Pat. No. 5,760,398 mentions an antenna (see col. 4, lines 18 and 67; col. 20, line 64 and col. 22, line 1) with respect to absorption of incident radiation but only in reference to the primary focus of their disclosure, i.e., the area receiver pixel radiation collector which is geometrical optical based.

Gooch in U.S. Pat. No. 5,777,328 discloses bolometer arrays with no antennas and each bolometer "a separately sensed pixel" (see col. 15, line 32).

Silver, et al in U.S. Pat. No. 5,777,336 discloses an array of microcalorimeters responsive to x-ray fluorescence, not infrared radiation.

Jack et al. in U.S. Pat. No. 6,329,655 discloses an improved coupling of the antenna to the detector element.

Choi in U.S. Pat. No. 6,410,917 discloses a polarization sensitive quantum well infrared photodetector (QWIP) where the detector unit is formed by a group of C-QWIP detectors having different groove orientations (see col. 3, line 22).

Grinberg et al. in U.S. Pat. No. 6,441,368 discloses an array of bolometers responsive to millimeter wave radiation, not infrared radiation.

Baker in U.S. Pat. No. 5,239,179 discloses an infrared detector device responsive to more than one wavelength of infrared radiation. The infrared detector elements are formed on the lower and upper levels of material of the substrate with the elements on the lower level having an infrared response different from the elements formed on the upper level.

Thus, the need exists for solutions to the problems in the prior art described above.

SUMMARY OF THE INVENTION

The first objective of the present invention is to provide an infrared (IR) detector antenna system and method of using an antenna system for simultaneously collecting image-forming radiation over multiple wavelengths.

The second objective of the present invention is to provide an infrared (IR) detector antenna system and method of using an antenna system for simultaneously collecting image-forming radiation over multiple polarizations.

The third objective of the present invention is to provide an infrared (IR) detector antenna system and method of using an antenna system where optical filters and beamsplitters are eliminated.

The fourth objective of the present invention is to provide an IR detector antenna system and method of using an antenna system where different materials are not required at each site to obtain a different spectral response.

The fifth objective of the present invention is to provide an IR detector antenna system and method of using an antenna system where the weight required for implementation is essentially zero.

The sixth objective of the present invention is to provide an IR detector antenna system and method of using an antenna system that is a two-dimensional focal plane array that can be developed in a monolithic format.

In the subject invention, infrared antennas are integrated into an infrared (IR) focal-plane-array (FPA) system. The arrangement is an array of independent antenna-coupled detectors, rather that a phased-array antenna. Each novel detector pixel square can have exterior dimensions that can fit any commercial FPA. These novel detector pixels can fill any FPA pixel dimensions desired. One embodiment of an individual pixel (unit cell) includes a series connection of individual antenna-coupled infrared sensors distributed over the unit cell.

Adjacent pixels of an infrared focal plane array can be configured to have different spectral or polarization responses by adjustment of the lengths or orientations of the antenna arms which couple radiation into the sensors. The manufacturing costs of such an antenna-coupled IR FPA would be much less than integration of spectral or polarization filters onto each pixel, or fabrication of adjacent pixels with materials of different bandgaps. The antenna-coupled pixels can be made smaller than usual pixels, allowing this diversity of spectral or polarization information on the FPA without losing spatial resolution.

These arrays can be used in remote-sensing systems to facilitate enhanced image recognition, feature extraction, and image-clutter removal. The application areas can include military and civilian remote sensing, automotive driving aids, industrial sensing, medical imaging, and general surveillance.

Further objects and advantages of this invention will be apparent from the following detailed description of the presently preferred embodiments which are illustrated schematically in the accompanying drawings.

BRIEF DESCRIPTION OF THE FIGURES

FIG. 1b is an enlarged view of one of the infrared detectors from a pixel of the Infrared Focal Plane Array of FIG. 1a.

FIG. 3 is an enlarged side view of the substrate, sensor and antenna of one detectors of the Infrared Focal Plane Array of FIG. 1a.

FIG. 4 is an enlarged view of the antennas and the IR sensor of FIG. 1a.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

This invention is related to U.S. Pat. No. 6,459,084, Issued Oct. 1, 2002, entitled "Area Receiver with Antenna Coupled IR Sensors," by one of the inventors and assignees of the subject invention, which is incorporated by reference.

Figure 1A:
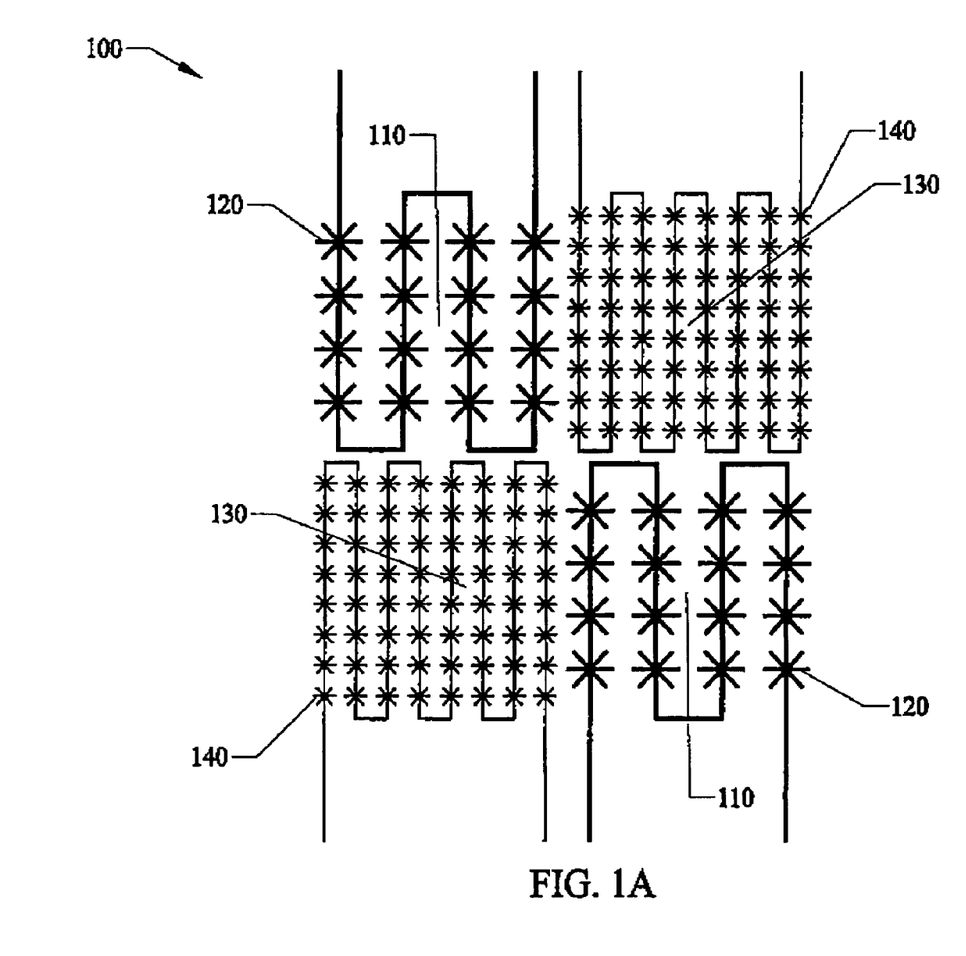
FIG. 1a is a plan view of the preferred embodiment of the Infrared Focal Plane Array showing adjacent pixels composed of a matrix of IR detectors responsive to differing wavelengths of IR radiation.
Figure 1B:
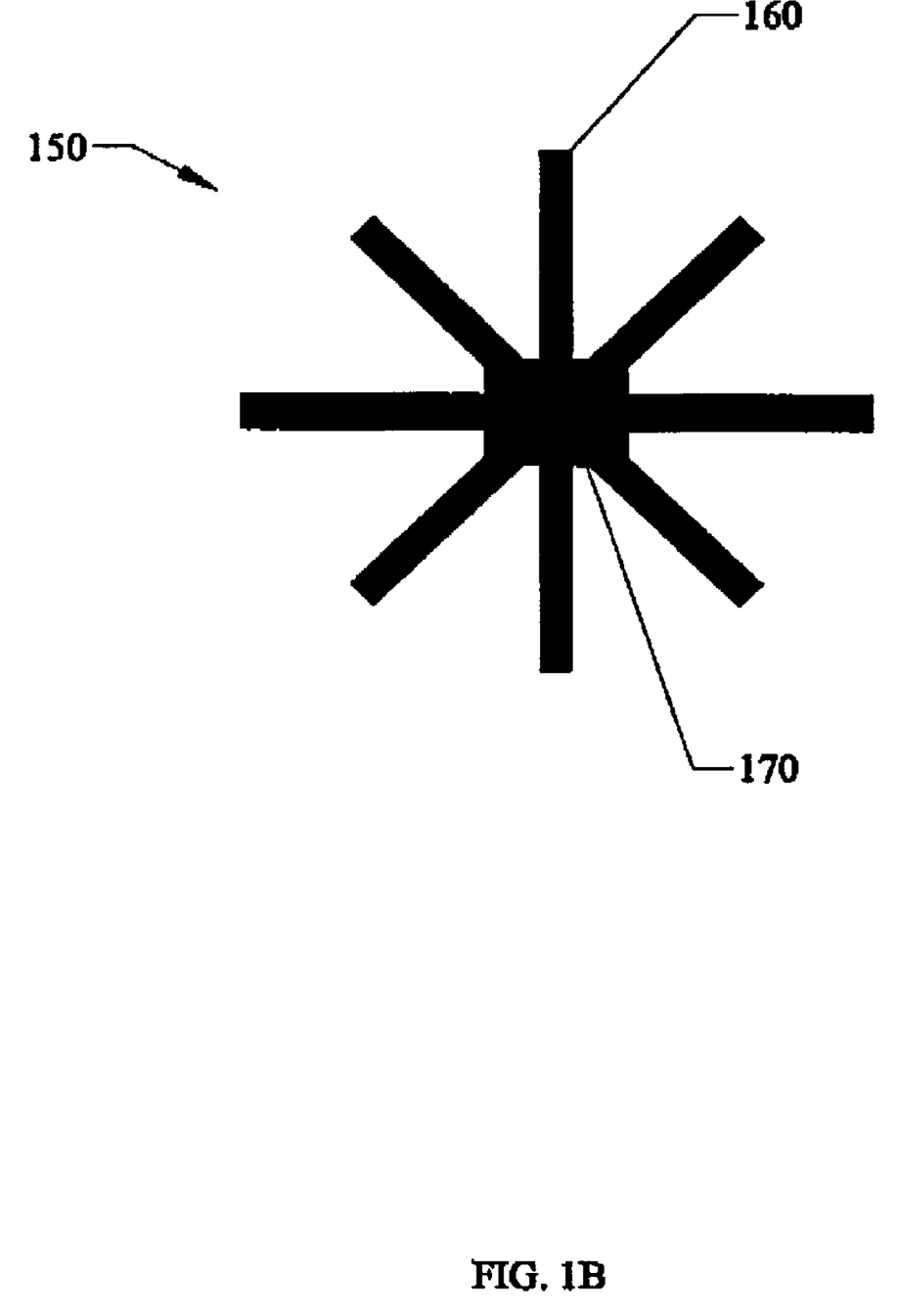

FIG. 1a is a plan view of the preferred embodiment of the Infrared Focal Plane Array 100 illustrating the arrangement of pixels on the array, with one pixel 110 composed of a matrix of IR detectors 120 responsive from approximately the 8 to approximately 12 micrometer region of infrared radiation, and the adjacent pixel 130 composed of a matrix of IR detectors 140 responsive from approximately the 3 to approximately the 5 micrometer region of infrared radiation. FIG. 1b is an enlarged view of one of the infrared detectors 150 from a pixel of the Infrared Focal Plane Array showing in detail the antennas 160 coupled to the sensor 170.

Figure 7:
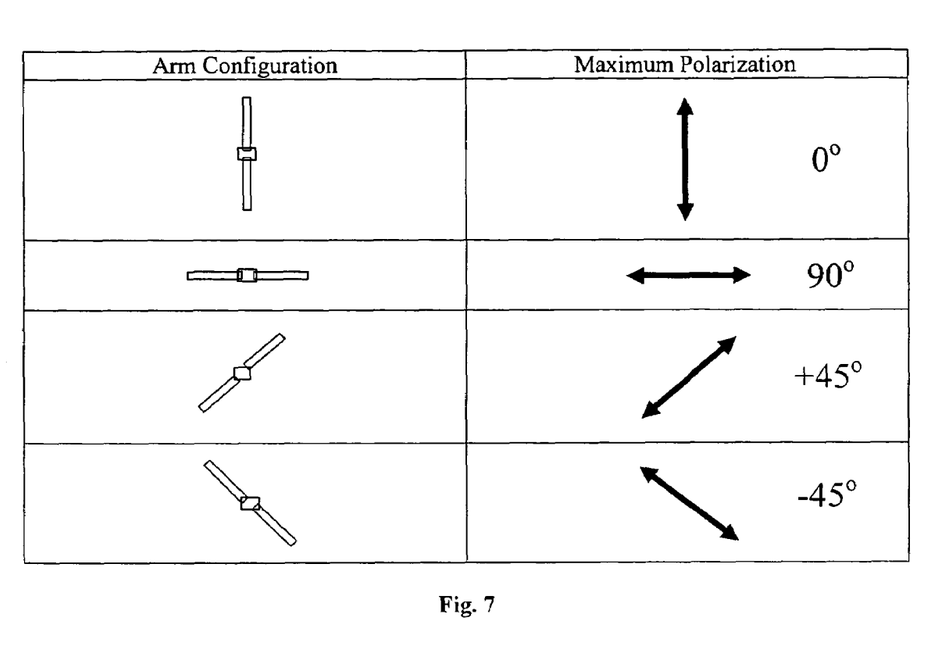
FIG. 7 shows the polarization response as a function of different arm configurations for the subject invention.

Adjacent pixels of an infrared focal plane array (IR FPA) can be configured to have differing spectral responses (Table 1) and polarization responses (FIG. 7) by adjustment of the lengths or orientations of the antenna arms 160 which couple radiation into the sensors 170. At least one of the lengths or the orientation of the antenna arms is adjusted to modify at least one of the spectral responses and the polarization responses of the antenna. Each antenna would be approximately one-half wavelength in linear dimension, with polarization along the main axis of the antenna. Differing lengths or orientations would give differing wavelength or polarization response. Referring Table 1, antenna arms have lengths between approximately 1.5 µm to approximately 6 µm and spectral responses between approximately 3 µm to approximately 12 µm. As shown in FIG. 7, the antenna arms have orientations selected from at least one of vertical, horizontal, forward angled, and rearwardly angled configurations for arm configurations and the polarization responses are selected from at least one of 0, 90, +45, and −45 degrees. The manufacturing costs of such an antenna-coupled IR FPA would be much less than a required integration of spectral or polarization filters onto each pixel, or fabrication of adjacent pixels with materials of different bandgaps. The antenna-coupled pixels can be made smaller than usual pixels, allowing this diversity of spectral or polarization information on the FPA without losing spatial response.

Figure 2:
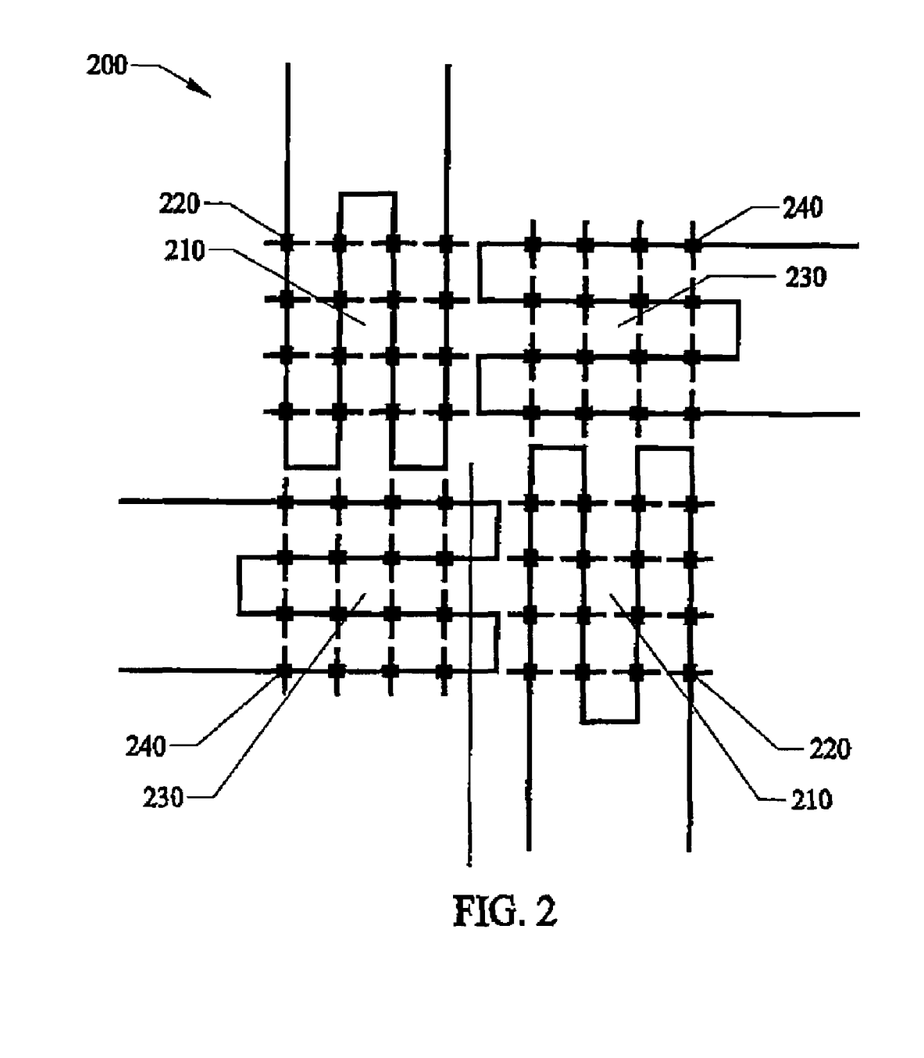
FIG. 2 is a view of a second embodiment of the Infrared Focal Plane Array showing adjacent pixels composed of a matrix of IR detectors responsive to differing polarizations of IR radiation.

FIG. 2 is a view of a second embodiment of the Infrared Focal Plane Array 200 illustrating the arrangement of pixels on the array, with one pixel 210 composed of IR detectors 220 responsive to infrared radiation of horizontal polarization, and the adjacent pixel 230 composed of IR detectors 240 responsive to infrared radiation of vertical polarization.

Figure 3:
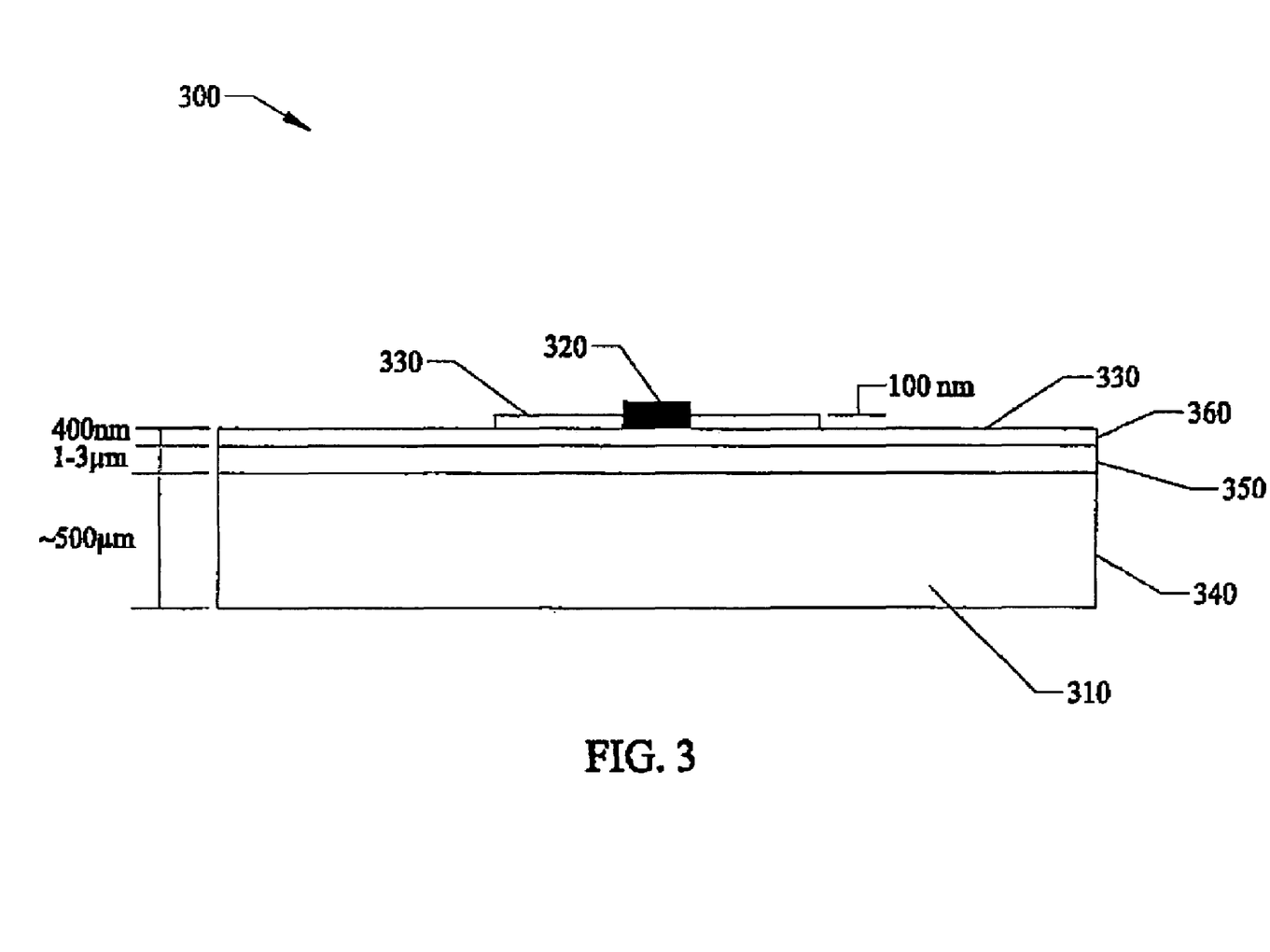

FIG. 3 is an enlarged side view of a section of the IR focal plane array 300 showing the substrate 310, the sensor 320, and the antenna 330 of the array 300. The substrate 310 can include readout electronics (ROIC) 340, such as but not limited to the SB276 designed by Raytheon which can include multiplexers on a circuit board type substrate, an approximately 1 micron layer 350 of silicon dioxide that can be used as sacrificial layer or as a passivation layer, and a thin layer (approximately 400 nm) 360 of silicon nitride that can be used to make a membrane to thermally isolate the sensor. Various types of sensors can be used for the IR FPA sensor 320 including bolometers, tunnel junctions (fast rectifiers), and QWIPs (quantum well infrared photodetector), tunnel diodes, Schottky diodes, photovoltaics, photoconductors, and pyroelectrics.

Figure 4:
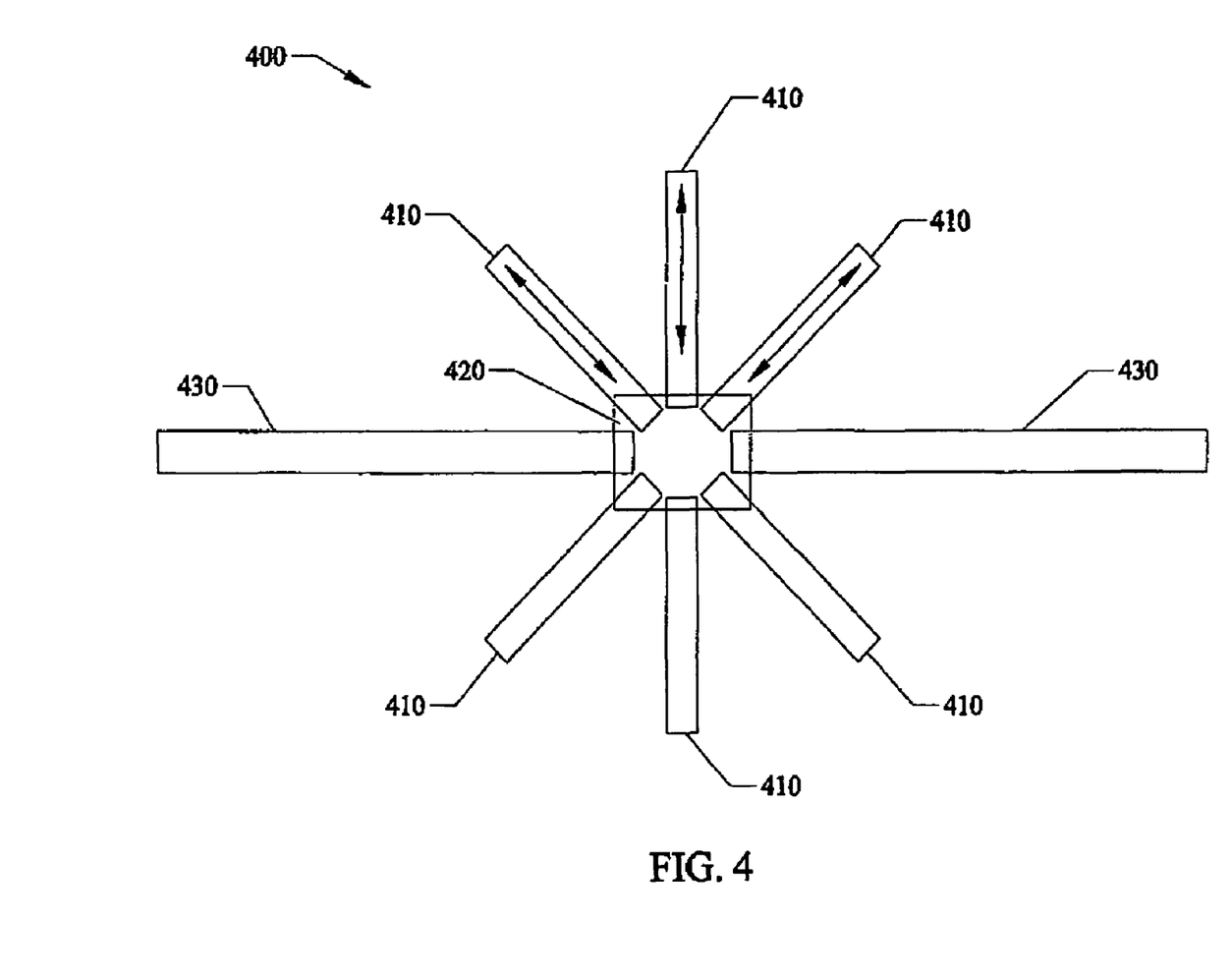

FIG. 4 is an enlarged view of the antennas 410 and the sensor 420 of the IR detector 400. Current generated in the antenna arms 410 flows through the sensor 420 that detects the incoming signal. The shape and configuration of the antenna arms 410 determines the wavelength and the polarization of the signal to be detected. At any wavelength, the antenna 410 allows a sub-wavelength-sized sensor 420 to present an appreciable capture cross section to electromagnetic radiation. The incident radiation induces IR-frequency current waves to flow in the arms of the antenna 410, and puts an IR-frequency sinusoidal voltage across the sensor element 420. Incident radiation will induce an electrical current in the antenna arms that will flow through the sensor which will detect the incoming signal. The shape and configuration of the antenna arms will determine the wavelength and the polarization of the signal to be detected. The DC-bias line 430 can be used to bias the sensor and to connect the sensor to the ROIC input terminals.

TABLE I

Spectral Response as a function of arm length for detectors designed to work in the 3–5 μm and 8–12 μm spectral bands.

| Arm Length | Resonant Wavelength |
|---|---|
| 1.5 μm | 3 μm |
| 2 μm | 4 μm |
| 2.5 μm | 5 μm |
| 4 μm | 8 μm |
| 4.5 μm | 9 μm |
| 5 μm | 10 μm |
| 5.5 μm | 11 μm |
| 6 μm | 12 μm |

Figure 5:
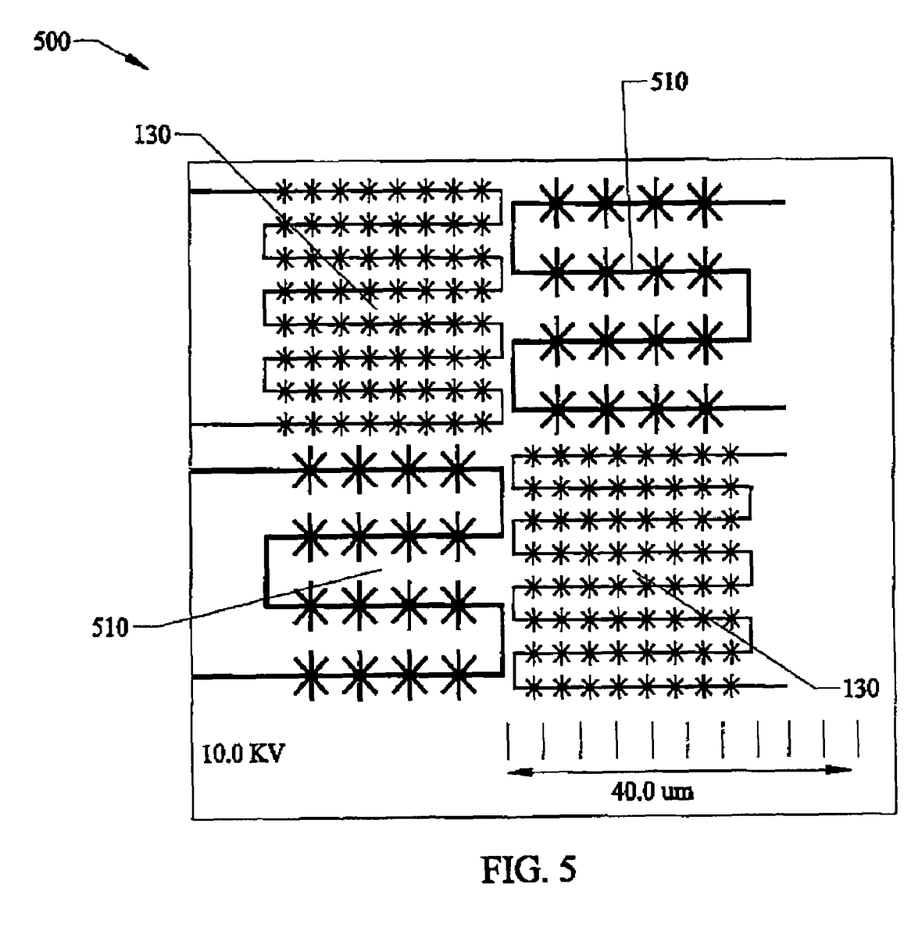
FIG. 5 is a view of the Proof-of-Concept Prototype for a two-color Focal Plane Array, shown on silicon nitride membrane.

FIG. 5. is an illustration of the Proof-of-Concept Prototype for a two-color Focal Plane Array 500, shown on silicon nitride membrane. Each pixel 510 of the two-color Focal Plane Array is approximately 25 microns by approximately 25 microns in dimension.

Figure 6:
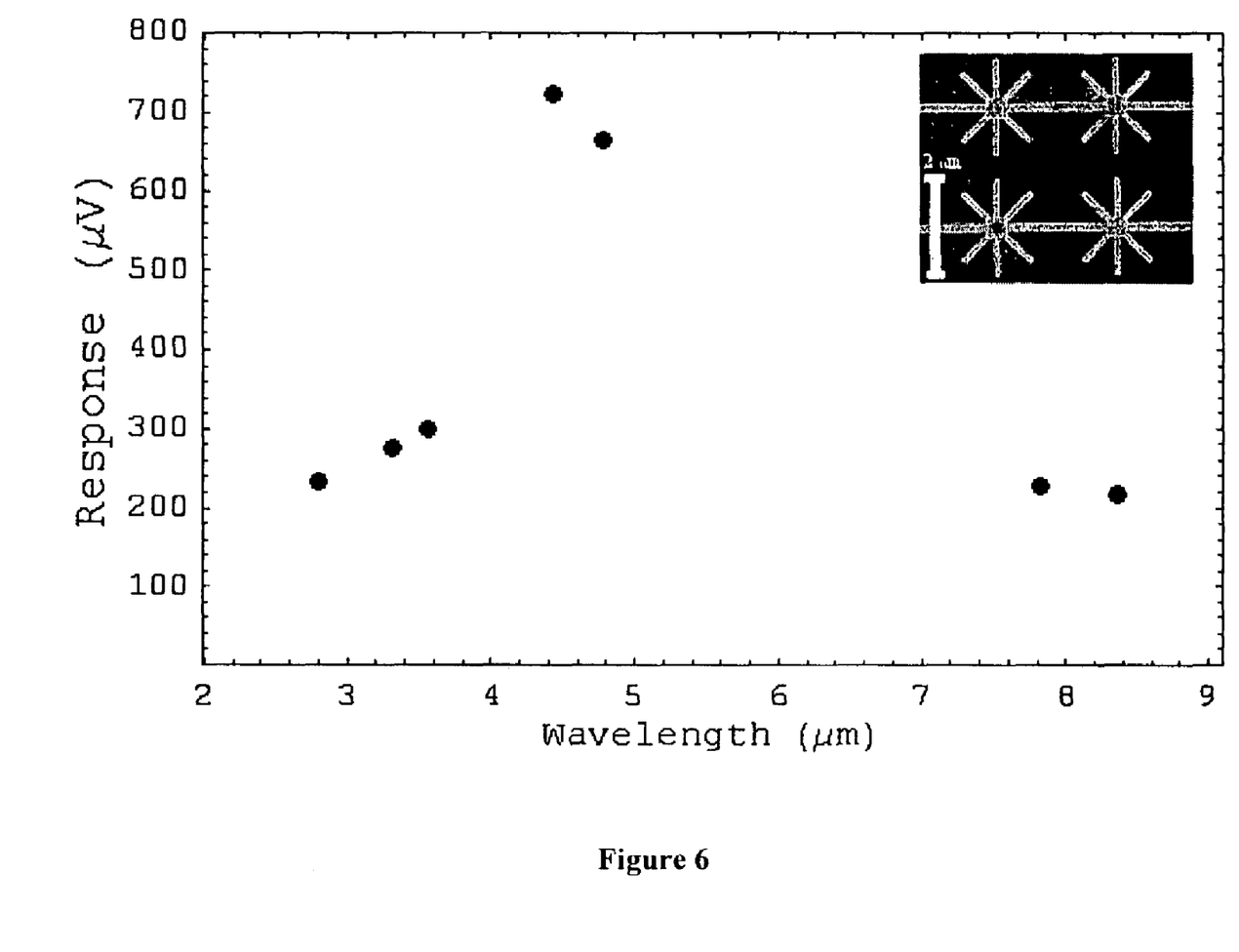
FIG. 6 is a graph of data measured from the detectors if the IR Focal Plane Array.

FIG. 6 is a graph of response voltage vs. wavelength data for the two-color IR Focal Plane Array of FIG. 5.

FIG. 7 shows the polarization response as a function of different arm configurations. Maximum polarization approximately 0, 90, +45, −45 degrees for arm configurations that are vertical, horizontal, forward angled, and rearwardly angled configurations, respectively.

During testing of the invention, the measurements were made using an approximately 1000 K black-body source and a filter wheel with the results normalized to the black-body curve and to the bandwidth of the filter. The data shows that the IR Focal Plane Array exhibits a variable response in both the region of approximately 3 to approximately 5 microns infrared radiation and in the region of approximately 8 to approximately 9 microns of infrared radiation.

The subject invention replaces the two-FPA-and-beamsplitter configuration and eliminates the need for moving parts such as filter wheels. It provides more capability in a smaller package and potentially low-cost fabrication.

The invention provides two-color or two-polarization imaging without cooling. It can be adapted for applications in military and civilian remote sensing such as earth resource mapping, surveillance, pollution monitoring, automotive driving aids, medical imaging, and the like. Other applications of the invention can also be used as determined by the skilled artisan.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An Infrared (IR) detector antenna unit for detecting IR radiation comprising:
   (a) a plurality of first and second infrared (IR) sensors for receiving different incident electromagnetic radiation arranged in a first and a second matrix of rows and columns, respectively;
   (b) a plurality of antenna arms coupled to and extending from each of said sensors whereby electromagnetic radiation incident on said sensor induces infrared-frequency current waves to flow in said arms;
   (c) a plurality of first pixels and second pixels arranged in a non-overlapping checkerboard patterned pixel matrix of rows and columns;
   (d) a conductive line connected to each of said plural JR sensors forming each of said plural first and second pixels; and
   (e) output means for receiving output from said plurality of first and second sensors wherein the IR detector antenna unit has multi-spectral multi-polarization response.

2. The IR detector antenna unit of claim 1, further comprising:
   pixels arranged in an antenna-coupled focal plane array (FPA).

3. The IR detector antenna unit of claim 1, wherein the infrared (IR) sensor is chosen from one of: tunnel diodes, Schottky diodes, photovoltaics, photoconductors, bolometers, quantum well infrared photodetectors, and pyroelectrics.

4. The IR detector antenna unit of claim 1, wherein the antenna arms would be approximately one-half wavelength in linear dimension.

5. The IR detector antenna unit of claim 1, wherein one pixel has a response to horizontally polarized infrared radiation and the adjacent pixel has a response to vertically polarized infrared radiation.

6. The IR detector antenna unit of claim 1, wherein one pixel has a response to a defined region of infrared radiation and the adjacent pixel has a response to a different defined region of infrared radiation, wherein the wavelength sensitivity is determined by the length of the plural antenna arms coupled to the sensors.

7. An Infrared (IR) detector antenna unit for detecting IR radiation comprising:
   (a) an antenna-coupled focal plane array of pixels;
   (b) said pixels each having a plurality of infrared sensors for receiving IR radiation, wherein adjacent non-overlapping pixels respond to a different IR radiation;
   (c) said infrared sensors each having a plurality of metal antenna arms coupled to the sensor, wherein a length of the plurality of arms connected with each infrared sensor corresponds to an IR radiation wavelength; and
   (d) output means for connecting and receiving output from said infrared sensors.

8. The IR detector antenna unit of claim 7, wherein the infrared sensors of a pixel are arranged in a first matrix of rows and columns and responds to a first IR radiation wavelength.

9. The IR detector antenna unit of claim 8, wherein the pixels are arranged in a second matrix of rows and columns and responds to a second IR radiation wavelength.

10. The IR detector antenna unit or claim 9, wherein a pixel of a cell of the second matrix is comprised of infrared sensors sensitive to approximately the 3 to approximately 5 micrometer region of infrared radiation and a pixel of an adjoining cell is comprised of infrared sensors sensitive to approximately the 8 to approximately 12 micrometer region of infrared radiation, wherein the wavelength sensitivity is determined by the length of the plural antenna arms coupled to the sensors.

11. The IR detector antenna unit of claim 9, wherein a pixel of a cell of the second matrix is comprised of infrared sensors sensitive to infrared radiation of horizontal polarization and a pixel of the adjoining cell is comprised of infrared sensors sensitive to infrared radiation of vertical polarization.

12. A method of providing multi-spectral and multi-polarization responses of an antenna array, comprising the steps of:
provi­ding plural arrays of antenna-coupled detectors, said antenna-coupled detectors having a sensor;
providing antenna arms connected to said sensors on an array with selected lengths and orientations;
adjusting at least one of the lengths and the orientation of the antenna arms; and
modifying at least one of the spectral responses and the polarization responses of the antenna, wherein adjacent non-overlapping arrays of arrays of antenna-coupled detectors correspond to different at least one of the spectral responses and the polarization responses.

13. The method of claim 12, wherein the lengths of the antenna arms have lengths between approximately 1.5 μm to approximately 6 μm; and spectral responses between approximately 3 μm to approximately 12 μm.

14. The method of claim 12, wherein the orientation of the antenna aims have orientations selected from at least one of vertical, horizontal, forward angled, anti realwardly angled configurations for arm configurations; and, the polarization responses are selected from at least one of 0, 90, +45, and −45 degrees.

15. The method of claim 12, wherein the antenna arms include:
pixels arranged in an antenna-coupled focal plane array (FPA).

16. A multi-spectral multi-polarization antenna-coupled infrared focal plane array comprising:
plural first arrays of antenna coupled detectors responding to a first infrared radiation arranged in a matrix of rows and columns;
plural second arrays of antenna coupled detectors responding to a second infrared radiation arranged in a matrix of rows and columns;
plural first pixels each including one of the plural first arrays of detectors;
plural second pixels each including one of the plural second arrays of detectors, wherein the plural first pixels and the plural second pixels are arranged in a checker-board pattern forming an array of pixels, wherein the infrared detector antenna unit has multi-spectral and multi-polarization responses.

17. The focal plane array of claim 16, wherein each antenna coupled detector of the plural first and second arrays of detectors comprise:
a sensor responsive to one of the first and the second infrared radiation; and
plural antenna arms connected with the sensor, wherein the spectral and polarization response of each sensor is dependent on a length and an orientation of the plural antenna arms.

18. An Infrared (IR) detector antenna unit for detecting IR radiation comprising:
an antenna-coupled focal plane array of pixels;
said pixels each having a plurality of infrared sensors for receiving IR radiation, wherein adjacent non-overlapping pixels respond to a different IR radiation;
said infrared sensors each having a plurality of metal antenna arms coupled to the sensor, wherein a length of the plurality of arms connected with each infrared sensor corresponds to an IR radiation wavelength; and
output means for connecting and receiving output from said infrared sensors, wherein the pixels are arranged in a first and second matrix of rows and columns and respond to a first and second IR radiation wavelength, respectively, and a different one of a horizontal and a vertical polarization.

* * * * *